Sept. 2, 1969  R. A. SUSDORF ET AL  3,465,186
DYNAMOELECTRIC MACHINE AND METHODS OF MANUFACTURING
ARMATURE ASSEMBLIES THEREFOR
Filed April 27, 1967  6 Sheets-Sheet 1

Inventors:
Robert A. Susdorf,
Fredrick J. Armstrong
by John M. Stoudt
Attorney.

Inventors:
Robert A. Susdorf,
Fredrick J. Armstrong
by John M. Stoudt
Attorney.

Sept. 2, 1969  R. A. SUSDORF ET AL  3,465,186
DYNAMOELECTRIC MACHINE AND METHODS OF MANUFACTURING
ARMATURE ASSEMBLIES THEREFOR
Filed April 27, 1967  6 Sheets-Sheet 3

Inventors:
Robert A. Susdorf,
Fredrick J. Armstrong,
by John M. Stoudt
Attorney.

Inventors:
Robert A. Susdorf,
Fredrick J. Armstrong,
by John M. Stoudt
Attorney.

United States Patent Office 3,465,186
Patented Sept. 2, 1969

3,465,186
DYNAMOELECTRIC MACHINE AND METHODS OF MANUFACTURING ARMATURE ASSEMBLIES THEREFOR
Robert A. Susdorf and Fredrick J. Armstrong, Fort Wayne, Ind., assignors to General Electric Company, a corporation of New York
Filed Apr. 27, 1967, Ser. No. 634,182
Int. Cl. H02k 23/64
U.S. Cl. 310—158                              17 Claims

ABSTRACT OF THE DISCLOSURE

A high performance dynamoelectric machine having a low inertia armature assembly and capable of fast response and acceleration rates especially suitable for such applications as single-capstan tape transports and other peripheral computer equipment. The armature assembly has a number of coils, with side portions non-circular in cross-section, positioned on an insulating layer adhering to the outer surface of the armature core and shaft. The coils are covered with insulating material compatible to the layer for maintaining the coils in proper position in the assembly. A single short-circuited winding is carried by the magnetic poles of a stationary member to enhance the low inductance and linear acceleration of the machine. The method of manufacturing the armature assembly insures the intimate relationships of the armature assembly components.

BACKGROUND OF THE INVENTION

The present invention relates to high performance, fast response type of dynamoelectric machines, and in particular to such machines incorporating low inertia armature assemblies, and to methods of manufacturing the assemblies.

In recent years, there has been an increasing demand for a so-called high performance type dynamoelectric machine in the form of a direct current electric motor capable of rapid response to fast changing operational requirements and conditions in the order of milliseconds. Single-capstan tape transports, disc packs, high-speed printers, card sorters and other computer peripheral equipment are representative of applications where exacting fast and repeated acceleration rates as well as high current switching are important, if not critical. Generally speaking, it is quite desirable that motors for this type of applications incorporate a low inertia armature assembly and produce as low inertial and inductive time constants as possible under the circumstances to permit the the rapid reaction to the changing conditions. An inductive time constant is normally considered to be approximately 62% of the time it takes for the motor to reach constant state conditions after the application of voltage to the motor. It is quite desirable to provide as little time as possible for current build-up, and hence torque, during acceleration and to achieve as high current without causing damage to the components. It is also desirable for best operating results that the acceleration characteristics, affected by armature inertia among other factors, of the motor be as linear as possible. The motor should be able to economically produce these performance characteristics for long periods of operation.

In studying these desirable features to achieve rapid response, it is believed that the armature assembly should have a low armature circuit inductance and resistance, a large magnetic mass for the armature core and contain as small a shaft as possible beneath the core for optimum results. One measure of this latter feature is an axial core length to shaft diameter (within the core) ratio. However, in actual practice, ratios above 17:1 have been particularly difficult to attain, especially where the assembly is required to accelerate rapidly to running speeds far in excess of 2,500 r.p.m. Under such conditions shafts of small cross-section have a tendency to bend and the armature assembly is subjected to high operating stresses. In addition, the ability to effectively dissipate heat from the armature assembly, especially when the motor operates at high temperature levels (internal motor ambients of 155° C.) is also a problem, as well as manufacturing the armature assembly to overcome the above problems, among others.

Accordingly, it is a primary object of the present invention to provide an improved dynamoelectric machine incorporating a low inertia armature assembly and an improved method of manufacturing the armature assembly.

It is another object of the present invention to provide an improved high performance dynamoelectric machine, capable of fast response to changing conditions, an armature assembly for the machine, and a method of manufacturing the armature assembly, which attain at least some of the desirable features mentioned above and overcome at least some of the problems noted previously.

It is a further object of the present invention to provide an improved dynamoelectric machine, capable of operation under applications requiring exacting fast and repeated acceleration rates, which has unusually low inertial and inductive time constants and efficient heat dissipating characteristics.

SUMMARY OF THE INVENTION

In carrying out the present invention in one form, we provide an improved high performance dynamoelectric machine capable of rapid response to fast changing operational requirements and conditions. It incorporates a stationary assembly or member having at least two magnetic poles having polar regions refining at least a part of an armature assembly receiving bore. The armature assembly is a low inertia type including a magnetic core secured to a shaft, with a commutator mounted in spaced relation to one end or side face of the core. A number of electrical conductors are connected in circuit with the commutator, the conductors having spaced apart side portions extending the axial length of the core and being electrically insulated by a layer of insulation from the outer surface of the core. In addition, the cross-section configuration of the side portions is non-circular with the greatest dimension across the portions being disposed generally radial. One group of conductor end portions is received between the end face of the core and the commutator. The conductor side portions are embedded in insulating material, which is compatible with the layer, to maintain the conductors in place, yet permits effective dissipation of heat from the armature assembly. A single short-circuited winding extends through the polar regions of the stationary member for reducing the inductive time constant of the machine and for linearizing the acceleration characteristics of the machine.

Among other benefits, the machine not only has low inertial and inductive time constants, but is also capable of long periods of operation under high temperature conditions. The invention permits the use of a large magnetic mass for the armature core to augment flux carrying capacity for the machine while at the same time furnishes a constant reluctance circuit therethrough. Further, core length to shaft diameter ratios in excess of 17:1 are readily possible without detrimentally affecting the performance of the machine, even at running speed far above 2,500 r.p.m. Thus, the machine delivers maximum power in the shortest possible time. Other advantages will be brought out hereinafter.

By a further aspect of the present invention, we provide improved method of manufacturing the armature assembly. In one form, after the core and shaft have been secured together the insulating layer is formed over selected outer surfaces thereof. The side portions of the conductors are arranged on the core, with portions of the same conductor located approximately 180 electrical degrees apart and sequentially connected to adjacent segments of the commutator. The electrical insulating material is applied over the conductors as the side portions are being maintained in firm engagement with the layer over the core. Once the material hardens, with the side portions being embedded therein, the conductors are held firmly against the layer in a position to effectively dissipate heat from the assembly. The process consistently produces sturdy assemblies having the desired properties and permits the use of low cost equipment.

The subject matter which we regard as our invention is particularly pointed out and distinctly claimed in the concluding portion of this specification. Our invention, itself, however, both as to its organization and method of operation, together with further objects and advantages thereof, may best be understood by reference to the following description taken in connection with the accompanying drawings.

BRIEF DESCRIPTION OF THE DRAWINGS

FIGURES 8–22 inclusive reveal the preferred method of manufacturing the low inertia armature assembly seen in FIGURES 2 and 6, FIGURE 8 illustrating one way in which adhesive may be applied to individual armature laminations during the formation of an armature core having an interlaminate adhesive layer between adjacent laminations;

DESCRIPTION OF THE PREFERRED EMBODIMENT

Turning now to the drawings in more detail, and in particular to FIGURES 1–6 inclusive, one form of the present invention is illustrated as being incorporated in an improved high performance direct current type two pole dynamoelectric machine or electric motor 30 having a low inertia armature assembly, the motor being especially suitable for use in such demanding fast response applications as single-capstan tape transports, disc packs, high speed printers, card sorters and other computer peripheral equipment. It is capable of operating with the type of duty cycle shown by curve 31 in FIGURE 1 where the machine develops unusually fast and linear acceleration characteristics as well as high initial current with a resulting high torque during starting conditions, among other beneficial features to be discussed more fully hereinafter.

Figures 1, 3, 4, 5:
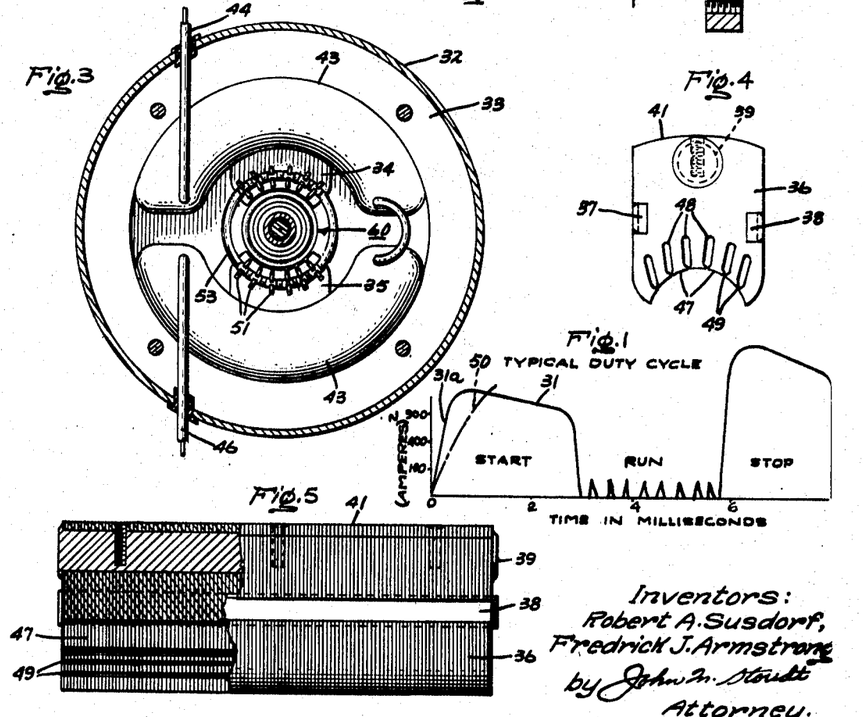
FIGURE 1 reveals a typical duty cycle which may be achieved by a dynamoelectric machine constructed in accordance with one form of the invention.
FIGURE 3 is a view taken along line 3—3 in FIGURE 2.
FIGURE 4 is an end view of one of the magnetizable field or magnetic poles for the machine of FIGURE 2.
FIGURE 5 is a side elevational view, partly broken away to show detail, of the pole seen in FIGURE 4.

In the illustrated form, machine 30 has a stationary member which includes an outer metal housing shell 32 surrounding an annular yoke section 33 of a wound field type stator and a pair of generally opposed magnetic poles 34, 35. Each pole is constructed with a laminated pole piece 36 having individual laminations secured together in stacked relation by a pair of axially extending interlocking groove and key structures 37, 38. In addition, a central rivet 39 is provided axially through pieces 36 in the vicinity of outer surface 41 to augment the securement of the stack and to provide threaded bores for receiving screws 42 in the mounting of outer surface 41 against a complementary inner surface of yoke section 33. Each pole piece carries a wound field coil 43 which is serially connected and adapted for connection to an external supply of suitable power source (not shown) through leads 44, 46 (FIGURE 3). The radially inner surface 47 of the pole pieces are formed with an arcuate shape and define a part of an armature receiving bore.

In the illustrated embodiment, the radially inner polar regions of the pole pieces also include a number of slots 48 which extend entirely through the stack and have entrances 49 opening at surface 47. These slots accommodate solid electrical conductor bars 51 constructed of copper or the like which are electrically joined together at each end of the pole piece by conductor rings 52, 53 thereby forming a squirrel cage or short-circuited winding. Sheets of polyethyline terephthalate (Mylar) or other suitable insulating material may be used in slots 48 to electrically insulate bars 51 from the magnetic stack. In operation, during changes in armature current, the squirrel cage winding serves to generate flux without increasing armature resistance. Rather, it assists to improve linear acceleration characteristics and by tending to minimize armature inductance to that approaching self inductance in air, it improves the commutation characteristics for the motor as well as playing a part in reducing the inductive time constant of the motor. Moreover, higher values of armature current are obtained during acceleration with a resulting higher peak torque. These features may better be appreciated from a comparison of curve portion 31a in FIGURE 1 with that of curve 50 which is representative of operation of the same motor which does not incorporate the squirrel cage winding construction.

Turning now to a consideration of the low inertia type armature assembly incorporated in motor 30, generally identified throughout the drawings by numeral 60, it is capable of revolving at unusually high speeds (e.g., far in excess of 2,500 revolutions per minute) and is quite sturdy and rugged even when it has core length to shaft diameter at the core ratios of 17:1 and above. Further, it enhances inertial and inductive time constants for the motor, while being capable of satisfactory operation even at elevated temperatures in the neighborhood of 155 degrees centigrade. More specifically, the armature assembly includes a central magnetic core 61 fabricated from a number of similarly stamped laminations 62 secured together into a stack by hardened interlaminate adhesive insulating material 63 (FIGURE 22), for example epoxy resin adhesive series A–701 commercially available from Armstrong Products Co., Inc. of Warsaw, Ind. which has been cured for two hours at 350° F. The core is rigidly mounted on the central part of an elongated shaft 64 by hardened adhesive material 66 which may be similar to material 63 in composition.

Figure 2:
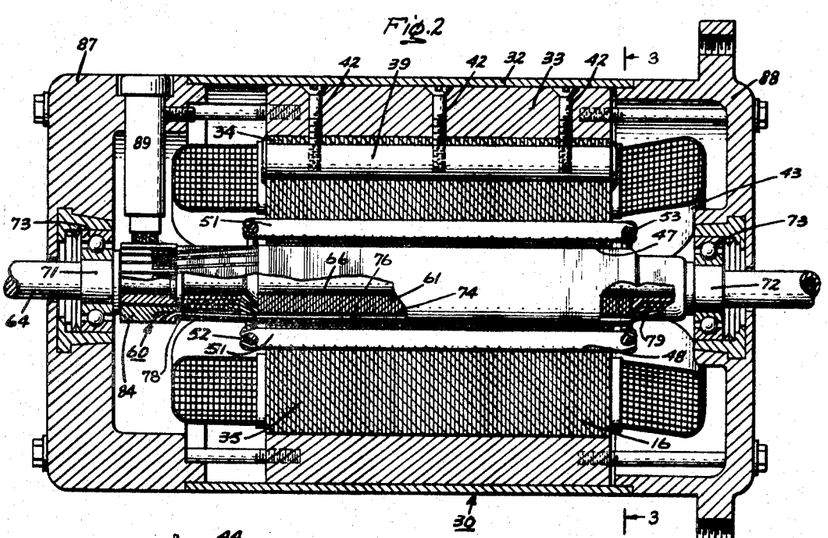
FIGURE 2 is a side elevational view, partly in cross section and partly broken away, of a direct current dynamoelectric machine incorporating one form of the present invention capable of operating with the duty cycle shown in FIGURE 1.
Figure 6:
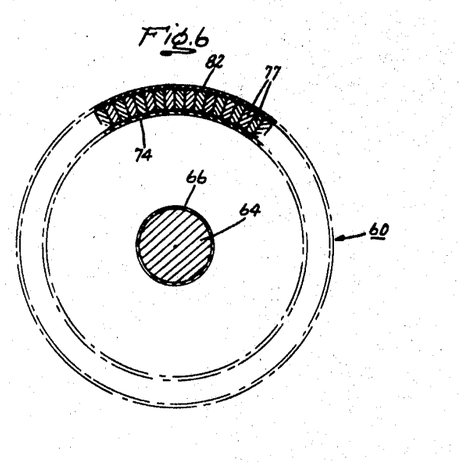
FIGURE 6 is a cross-sectional view of the armature incorporated in the dynamoelectric machine shown in FIGURE 2.
Figure 11:
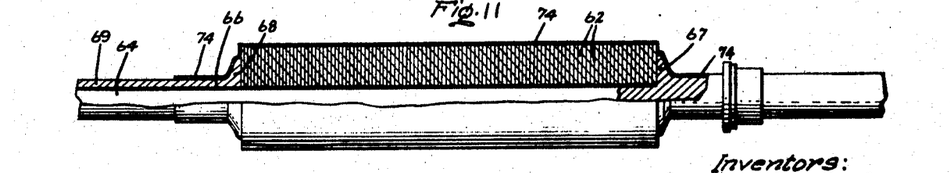
FIGURE 11 displays the armature core attached to the shaft, with the core and shaft having a relatively thin adherent insulating coating covering preselected peripheral portions thereof for electrically insulating the armature electrical conductors or coils from the core and shaft.

It should be noted at this time from FIGURE 11 that the core 51 abuts against an enlarged radial shaft shoulder 67 at the one end and against enlarged shoulder 68 of a hollow sleeve 69 at the other end which is united to the shaft by adhesive material 66. This provides a strong construction sandwiching the core between the shoulders, and furnishes seats 71, 72 of enlarged diameters for accommodating the inner races of ball bearings 73 (FIGURE 2). The outer surfaces in the vicinity of these shaft shoulders as well as the outer axially extending surface of the armature core are covered with relatively thin hardened layers 74 of adherent insulating material, for instance, synthetic polyester resins of the type disclosed in U.S. Patent 2,936,296 issued to Frank M. Precopio and Daniel W. Fox on May 10, 1960. These layers serve to insulate the electrical conductors of the armature coils from the core and shaft components and layers in the order of 0.003 inch (3 mils) in radial thickness have been found quite adequate in actual practice for this purpose.

Figure 15:
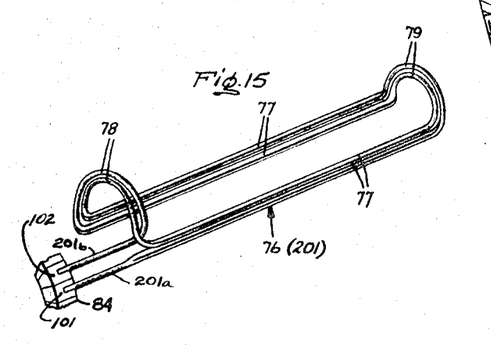
FIGURE 15 is a view in perspective of the first coil of FIGURE 14 properly connected in circuit with the commutator.
Figure 21:
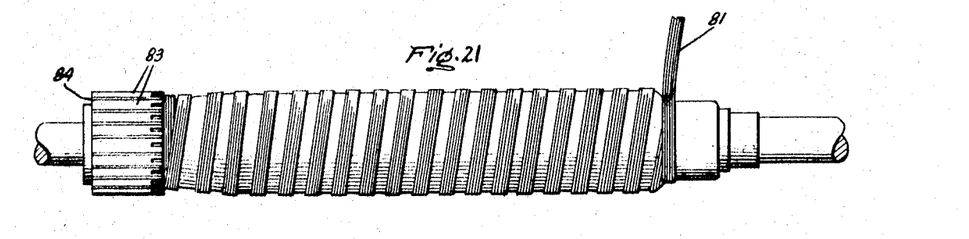
FIGURE 21 is a side elevational view of the armature unit as suitable binding is being spirally wound around the longitudinal periphery of the unit.
Figure 22:
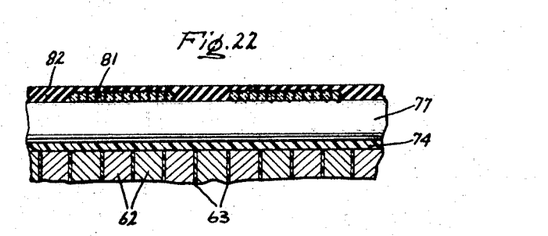
FIGURE 22 is a fragmentary and enlarged section of the finished armature more fully illustrated in FIGURE 2.

In the illustrated embodiment, the armament coils, shown by numerals 76 in the various figures (see FIGURE 15 in particular) are surface wound, that is, carried radially beyond the core, and include two turns of electrical conductors having an adherent insulating coating, such as magnet wire composed of copper. Axially extending side portions 77 of the conductors are accommodated on layer 74 directly over the core. These portions are non-circular in cross-section configuration, such as an oblong shape, having the largest transverse dimension or major axis disposed in a generally radial direction. This dimension preferably is in the neighborhood of two to three times that of the minor axis in order to insure that the coating adhering to individual conductors will not be damaged, and at the same time, to furnish a large conductor mass or density for a given space. The end portions 78, 79 of the coils positioned beyond the respective side faces of the core 61 next to layers 74 disposed on the shaft, are generally circular in cross-section. This arrangement permits the positioning of the spaced apart side portions 77, center to center from one side portion to the angularly spaced apart other side portion for a given coil, at approximately 180 electrical degrees. Moreover, the large mass positioned outwardly of the core facilitates the dissipation of heat from the armature assembly during machine operation. Helical turns 81 of glass binding or yarn (e.g. 1½ mils in diameter) may be wound over conductor portions 77, 78, 79 as best shown in FIGURES 21 and 22 and a thin coating of insulating material like Permafil varnish (for example, 3½ mils in radial thickness) applied over the periphery of the coils 76 and the multi-stranded binding 81 to fill the voids and to hold these components firmly in place. Material 82 should be compatible with layers 74, so that it will bond to the layers when it is formed over the coils and binding. While providing a protective covering over the coils which are embedded therein, it also permits dissipation of heat from internally of the armature assembly. The preferred manner in which the coils are connected in circuit with commutator segments 83 of commutator 84, suitably attached by adhesive to rotate with shaft 64, will be considered in more detail hereinafter.

The following example is given to show in more detail how the invention as described above has been carried out in actual practice and to reveal more fully the benefits which may be derived from its use. The stator and armature assembly were constructed in accordance with the illustrated embodiment with the following nominal dimensions (in inches) in addition to those already given:

|   | Inches |
|---|---|
| Outer diameter of armature assembly | 0.950 |
| Stator bore diameter | 0.975 |
| Air gap | 0.0125 |
| Shaft diameter at output end | 0.498 |
| Shaft diameter at core | 0.188 |
| Core length | 4.00 |
| Core length to shaft diameter ratio | 21 |
| Armature coil diameter at end portions | 0.031 |
| Coil side portions, major axis | 0.042 |
| Coil side portions, minor axis | 0.0201 |

Figure 7:
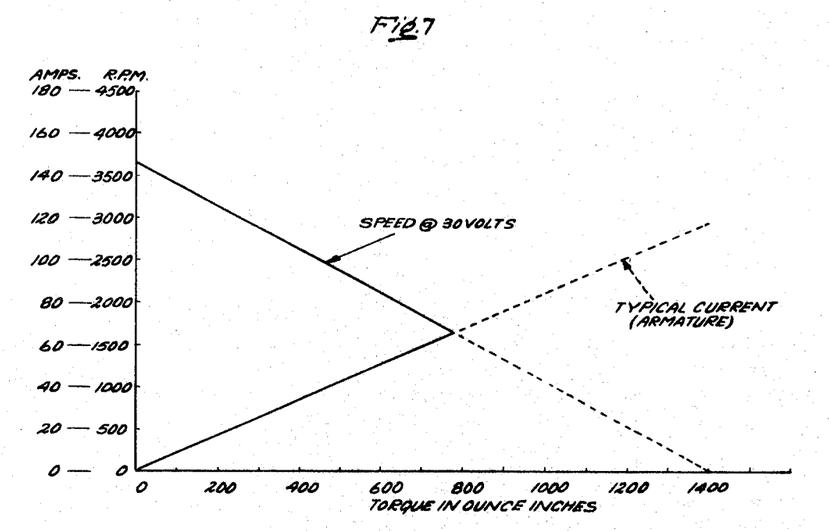
FIGURE 7 is a graph showing representative linear torque-current and torque-speed curved for a given size dynamoelectric machine constructed in accordance with the illustrated embodiment of FIGURE 2.

The armature assembly has 33 commutator segments 83 and coils 76, with a pair of opposed brush assemblies 89 (one shown in FIGURE 2) being mounted for cooperation with a circumferential brush track of commutator 84. The motor, which weighed about twenty-six pounds, was furnished with the fluid cooling system disclosed in our co-pending application Ser. No. 634,183 filed on the same day as this application. However, it could be constructed with the illustrated end frames 87, 88 or other frame constructions if the advantages of the invention disclosed in Ser. No. 634,183 were not required for the application. It produced the linear torque-speed and torque-current curves shown in FIGURE 7 and, when mounted in a computer application, performed with the following results:

|  | Units | Performance |
| --- | --- | --- |
| Rated Armature Voltage | Volts | 30. |
| Rated Armature Current | Amps | 26.5 at 50 c.f.m. |
| Rated Torque | Oz.-in | 326. |
| Rated Speed | R.p.m | 2,800. |
| Rated Output | Watts | 675. |
| Inductance, Armature Circuit | Microhenries | 100. |
| Resistance, Armature Circuit | Ohms | .26. |
| Voltage Constant | Volt-sec./rad | .085. |
| Torque Constant | Oz.-in./amp | 12.3. |
| Armature Inertia | Oz.-in./sec.$^2$ | .0044. |
| Pulse Torque—50 milliseconds | Oz.-in | 2,460. |
| Pulse Current—50 milliseconds | Amps | 200. |
| Intertial Time Constant | Milliseconds | 1.40. |
| Inductive Time Constant | Milliseconds | .43. |
| Torque/Inertia at Rated Voltage | Rad/sec.$^2$ | 330,000. |
| Continuous RMS Current Rating | Amps | 26.5 at 50 c.f.m. |
| Cooling Air | c.f.m. at in. H$_2$O | 50 at 37. |

Armature assembly 60 in certain applications has been successfully run at speeds in excess of 16,000 r.p.m.

From the above results (which are self-explanatory), it will be seen that the motor constructed in accordance with our invention is a high performance, rapid response type capable of long life operation even at unusually high temperatures, for instance 155° C. In addition, it will be appreciated that a large magnetic mass for a given size armature core and shaft may be provided, the construction adding flux carrying capacity for a given size which tends to enhance low inertia characteristics for the motor. The core structure also does not restrict the flux path through it to furnish a constant reluctance circuit. Further, in spite of the axial length of the shaft, there is little tendency for it to bend even at high speeds. Thus, the motor is particularly suitable for use where maximum power in the shortest possible time is desired, such as the previously mentioned computer peripheral applications.

Figure 8:
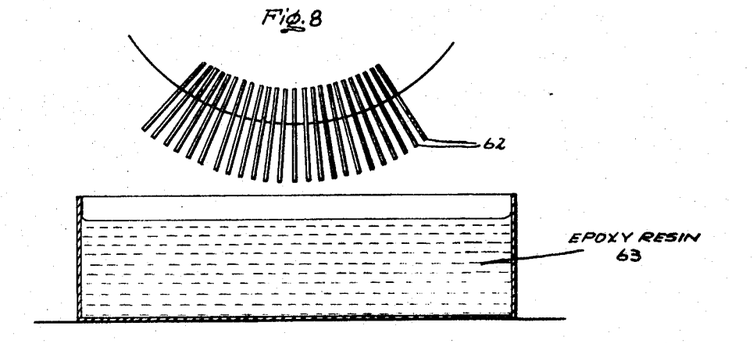
Figure 9:
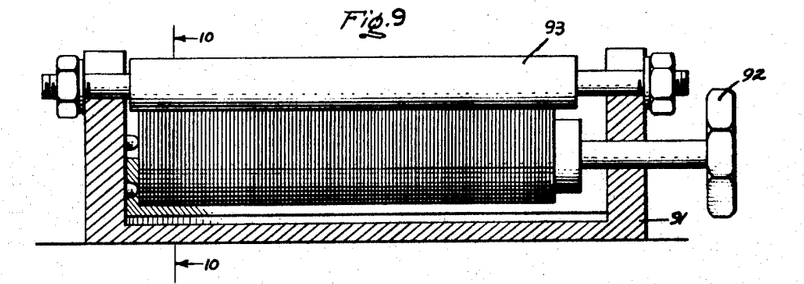
FIGURE 9 shows the individual laminations being stacked in aligned relation.
Figure 10:
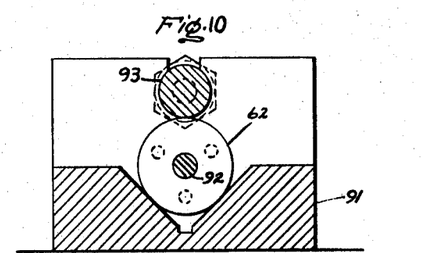
FIGURE 10 is a view along line 10—10 in FIGURE 9.

Turning now to a further aspect of the present invention, and more specifically to FIGURES 8–22 inclusive, there is disclosed an improved method of manufacturing or fabricating armature assembly 60. Laminated core 61 is assembled by applying adhesive material 63 in an unhardened state onto the side faces of laminations 62 in any convenient way, such as by an immersion procedure shown in FIGURE 8. Prior to this step, the laminations should be suitably de-burred and cleaned by well-known techniques. Thereafter, the laminations are aligned and held tightly together until the interlaminate material 63 becomes hardened or cured. A clamping unit 91 (FIGURES 9 and 10) for applying axial pressure may be used to achieve this end by tightening hand screw 92 after a roller or cylindrical bar 93 engages the outer periphery of the laminations to align them. Excess material squeezed out from between adjacent laminations in the stack may be wiped away or otherwise removed before the material hardens.

Adhesive material 66 is then provided on the desired surfaces of the shaft 64, as illustrated in FIGURE 11, while the shaft and core are preheated to facilitate the flow of the material. The core is pressed into firm engagement with radial shoulder 67 and hollow sleeve 69 slid over the shaft tightly against the other end of the core. These components are maintained with these relationships until the material has hardened; sleeve 69 thus in effect becomes part of the shaft. The outer surface of the core and shaft may be machined to the desired dimensions. Layer 74 is then formed on the illustrated locations in any suitable way, as by a conventional fluid bed procedure or other process well known in the art, and the length over the core again machined to size. Thereafter, commutator 84 may be mounted as a sub-assembly onto the shaft, by adhesive or otherwise in the desired axial position in axially spaced relation to one end or side face of the core.

Figure 12:
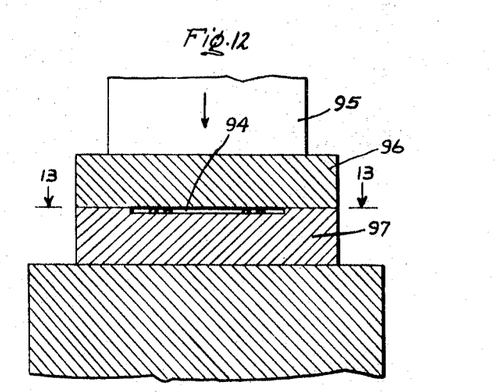
FIGURE 12 is a cross-sectional view of equipment which may be utilized to obtain the desired configuration for the individual turn side portions of the armature coils.
Figure 13:
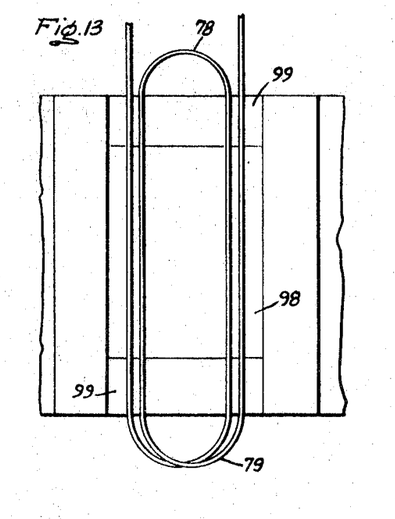
FIGURE 13 is a view taken along line 13—13 in FIGURE 12.
Figure 14:
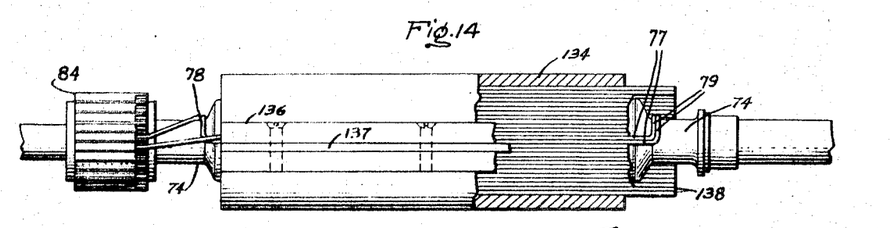
FIGURE 14 is a plan view, partly broken away, of equipment which may be used to assemble the coils in their proper positions onto the core and shaft unit of FIGURE 10, the figure showing the assembly of the first coil of the armature winding onto the core and shaft unit.

FIGURES 12 and 13 show one way in which coil side portions 77, which lie over the core 61, are pre-formed into the non-circular or oblong cross-section configuration. A preselected length of electrical conductor wire is wound into the desired elongated shape, with portion 77 placed in the die cavity 94 of the dies 96, 97. Numeral 98 indicates the working face of the die having a longitudinal dimension slightly greater than the axial length of the core, for instance 0.12 inch; numeral 99 refers to die relief sections designed to avoid interference with the original circular cross section of the wire. A hydraulic press 95 is employed to produce pressure movement of the dies resulting in a sliding motion, linear with the coil as the wire side portions are held straight as illustrated to flatten the side portions.

Figure 16:
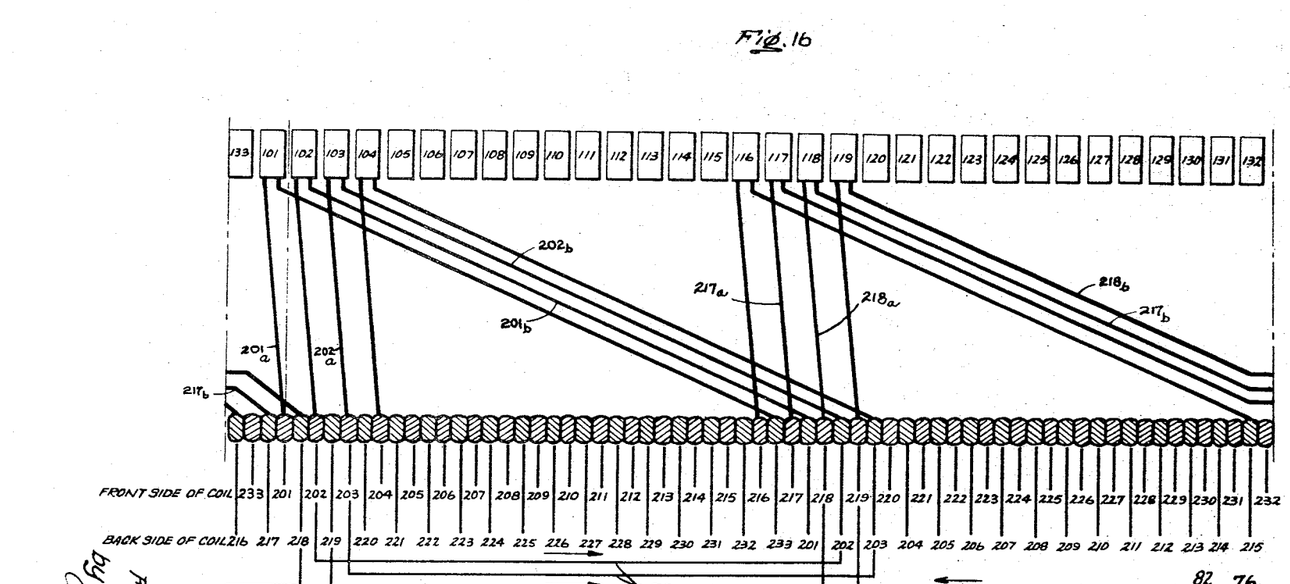
FIGURE 16 is a schematic diagram illustrating the development of and the order of placement for the armature coils and commutator circuit, with the complete connection of four coils being shown.
Figure 17:
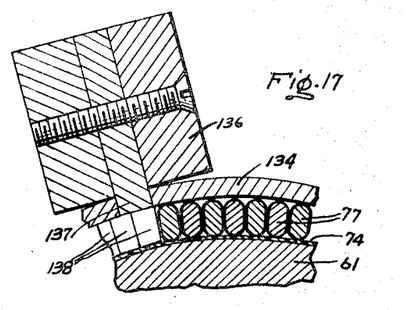
FIGURE 17 is a partial cross-section view revealing further details of the armature coil and core assembling steps.

The manner of positioning the desired number of coils 76 onto the core and their attachment in the circuit of the commutator 84 will be considered in connection with FIGURES 14–17 inclusive. In the exemplification, thirty-three commutator segments and armature coils are employed, the segments being specifically identified by numerals 101–133 inclusive and the coils by numbers 201–233 inclusive in FIGURE 16. In FIGURE 16 each coil side section shown represents two turns. Initially, a slotted sleeve 134 (FIGURES 14 and 17) is arranged directly over the core, with a coil side inserting bar 136 having a projection 137 positioned in the slot of the sleeve. A plurality of spacers or rods 138, corresponding in number to the total individual side portion turns, are loosely held between the sleeve and layer 74 such that they project axially beyond one end of the sleeve to permit their ultimate removal.

In placing the coils with their side portions 180 electrical degrees apart on layer 74 within sleeve 134 (see FIGURE 16) bar 136 is withdrawn from the sleeve and several spacers 138 removed from within the sleeve to provide the required space for accommodating side portions 77 of coil 76. The bar is reinserted into the slot of the sleeve, the sleeve then rotated to the desired angular position (such as 180 electrical degrees away) and the next placement of coil sides is accomplished.

Figure 18:
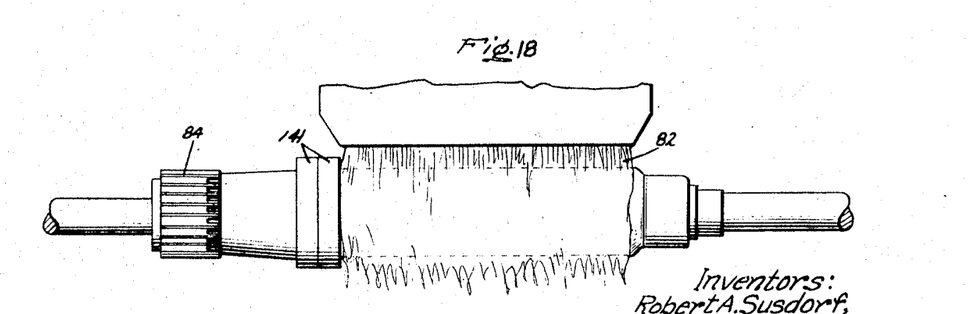
FIGURE 18 shows one way in which unhardened adhesive material may be applied over the coils once they have been assembled onto the armature core and shaft unit.
Figure 19:
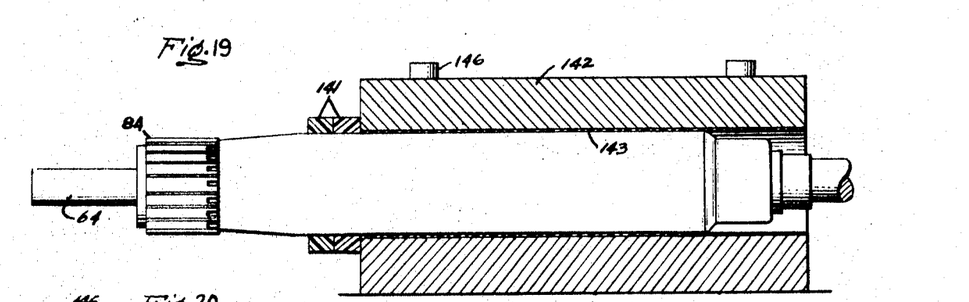
FIGURE 19 is a view, partly in cross-section, of one way in which the armature coils may be firmly held in position on the unit as the adhesive material is being hardened.

For purposes of illustration, it will be assumed that the back side of coil 217 and the front side of coil 201 (the first and middle numbered coils of the thirty-three total) are placed into position first on the core. The sleeve is then rotated 180 degrees and the front side of coil 217 as well as the back side of coil 201 are inserted through the sleeve slot onto layer 74 after the spacers have been removed. The end portions 78, 79 may be pressed downwardly firmly onto layer 74 (FIGURE 14) to make space available for receiving additional end portions and to provide a compact mass. Leads 201a, b of coil 201 are staked or otherwise arranged onto adjacent segments 101, 102, after two leads per segment have been installed. In a like manner, coil leads 217a, b of coil 217 may be connected to adjacent segments 117, 118 once two leads per segment are in place. The back side of coil 218, front side of coil 202, front side of coil 218 and back side of coil 202 are thereafter arranged on the core, and leads 202a, b and 218a, b are respectively connected to adjacent segments 102, 103; and 118, 119. This sequence of steps is repeated until all of the coils have been positioned on the core and connected in circuit with the proper commutator segments. FIGURE 16 shows only a few of these circuit connections in the interest of brevity while arrows show an assumed direction of current flow through certain coils. After sleeve 134 is finally removed from the assembled components, rings 141 (FIGURES 18, 19) may be slid over the wire side portions to hold them temporarily in position for handling.

Figure 20:
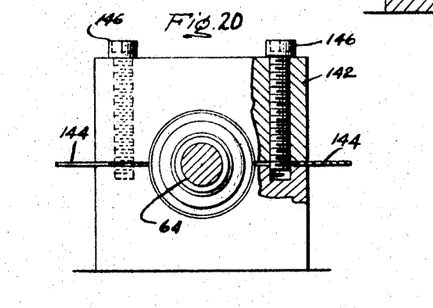
FIGURE 20 is an end view of the components shown in FIGURE 18 after the armature unit has been fully inserted into the armature holding block.

The armature components assembled so far are preheated, rings 141 moved to one side, and material 82 in unhardened form (FIGURE 18) is applied, as by a pouring operation, over the armature coils to fill voids. The heat from the pre-heated components augments the flow of the unhardened material 82 around the coils. Excess material is allowed to drip off and the material hardened or cured while the coils are being maintained under pressure firmly against layer 74. A split-block fixture 142 (FIGURES 19, 20) lined with Teflon 143 may be used for this purpose. Shims 144 may be taken away once the core and coil side portions are positioned within the confines of the fixture, and pressure applied by tightening screws 146. Thereafter, multi-strand glass binding 81 may be spirally wrapped around the periphery of the unit in a single layer as shown in FIGURE 21, and additional material 82 formed over the binding and between spaced apart binding turns to completely embed the coils and binding as shown best in FIGURES 2 and 22. Once material 82 has hardened, the outer surface of the armature assembly 80, adapted to fit within the bore of the stator, may be machined or ground to a very accurate size if so desired.

This procedure not only produces an unusually strong and accurately dimensioned armature assembly, but does so by permitting the use of relatively inexpensive equipment. Further, the process is capable of disposing the side portions of the same coils at 180 electrical degree locations in spite of the fact that the assembly is of a surface wound type and that the side portions are formed with non-circular cross-sections.

DESCRIPTION OF A SECOND EMBODIMENT

Figure 23:
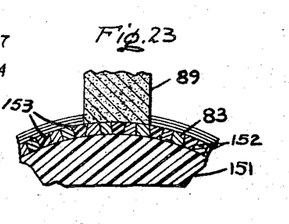
FIGURE 23 is a partial and enlarged elevational side view in cross-section showing the commutation end of a second embodiment of the armature.
Figure 24:
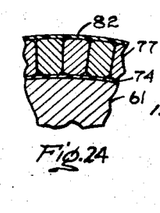
FIGURE 24 is a fragmentary and enlarged cross-section view of the coil side portions of the armature shown in FIGURE 23.
Figure 25:
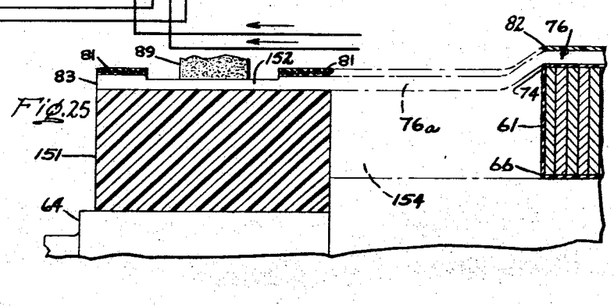
FIGURE 25 is a fragmentary and enlarged cross-section view of a part of the commutation portion of the armature of FIGURE 23.

FIGURES 23, 24 and 25 reveal a modification of the armature assembly disclosed above in connection with motor 30 of the examplification and similar components to those already described are identified by the same numbers. The second embodiment differs from that of FIGURES 1–22 inclusive principally in that the coil side portions are of generally trapezoidal cross-section configuration (FIGURE 24) having flat sides disposed somewhat radial in regard to the rotational axis of the machine. This provides a high degree of coil material density for a given size armature. In addition, the coil leads 76a terminate over a hardened annulus 151 of electrically insulating material attached to the shaft 64 in the axial position of the commutator. The lead terminations, preferably trapezoidal in cross-section for optimum material utilization, are arranged in angularly spaced apart pairs to form commutator segments 83. The upper surface of the leads are machined or otherwise cut into a smooth central brush accommodating track 152, which extends circumferentially around the commutator. Hardened material 153, similar to material 82, is disposed between adjacent pairs of leads to electrically separate commutator segments and to retain them in place on annulus 151. Binding 81 and additional material 82, located on either side of track 152, insure the proper securement of the components for rotation with the shaft 64. The space between core 61 and annulus 151, denoted by numeral 154 and shown in phantom, accommodates end portions of the coils at one side of the core. This construction is relatively inexpensive, has good heat dissipation characteristics and adds little inertial mass to the armature assembly.

It should be apparent to those skilled in the art, while we have shown and described what at present is considered to be the preferred embodiments of our invention in accordance with the patent statutes, it is to be understood that modifications can be made without actually departing from the true spirit and scope of this invention. For example, the invention may be incorporated in dynamoelectric machines operating with more than two poles. We therefore intend to cover in the following claims all such equivalent variations as fall within the invention.

What we claim as new and desire to secure by Letters Patent of the United States is:

1. A dynamoelectric machine comprising a stationary member including at least two magnetic poles having polar regions formed with axially extending surfaces providing parts of an axially extending pole; a low inertia type armature assembly mounted for relative rotation with respect to said stationary member comprising a shaft; a magnetic core secured to said shaft and having an outer axially extending surface disposed in the bore; a commutator including a number of commutator segments mounted to said shaft next to one end of the core; a number of electrical conductors connected in circuit with said commutator segments and having angularly spaced apart side portions extending the axial length of the core radially beyond the outer surface thereof with pairs of conductor side portions being joined together by end portions at the other end of the core, said side portions being non-circular in cross-section configuration and being fixed to rotate as a unit with the core with the largest cross-section dimensions being disposed in a direction generally away from the core; and means electrically insulating the electrical conductor side portions from the core whereby said electrical conductors efficiently transfer heat generated in the armature assembly away from the interior thereof during operation of the machine.

2. The dynamoelectric machine of claim 1 in which a number of electrical conductors extend through said polar regions and are electrically joined together adjacent each axial end of the magnetic poles by conductor rings to form a short-circuited winding for inducing currents opposing field changes resulting from changes in armature current to linearize acceleration of the machine and reduce the inductance of the armature assembly to improve commutation thereof.

3. The dynamoelectric machine of claim 1 in which the side portions of the same electrical conductor are positioned approximately 180 electrical degrees apart and the end portions thereof are generally circular in cross-section configuration.

4. The dynamoelectric machine of claim 1 in which the means electrically insulating the electrical conductor side portions from the core of the armature assembly comprises a first layer of hardened electrical insulation adhering to the outer surface of the core, said end portions of the electrical conductors being electrically insulated from the shaft by a second layer of hardened electrical insulation adhering to the outer surface of the shaft remote from the commutator.

5. The dynamoelectric machine of claim 4 in which hardened electrical insulating material, compatible with said first layer adhering to the outer surface of the core, covers at least said side portions thereby holding the electrical conductors firmly on said first layer and forming a hard protective insulating covering surrounding said side portions.

6. A dynamoelectric machine having a low inductive time constant comprising a stationary member including at least two magnetic poles having regions formed with axially extending surfaces to define at least part of an extending pole, means for generating flux through said poles; and an armature assembly mounted for relative rotation with respect to said stationary member comprising a shaft; a magnetic core secured to said shaft and having an outer axially extending surface; a commutator including a number of commutator segments mounted to said shaft next to one end of the core forming a brush accommodating track; a number of electrical conductors connected in circuit with said commutator segments and having angularly spaced apart side portions extending the axial length of the core radially beyond the outer surface thereof, with pairs of conductor side portions being joined together by end portions at the other end of the core, said electrical conductors being fixed to rotate as a unit with the core; means electrically insulating the electrical conductor side portions from the core; and short-circuited winding means having conductors extending through said polar regions of said stationary member for reducing the inductive time constant of the machine and tending to linearize the acceleration characteristics thereof.

7. The dynamoelectric machine of claim 6 in which the circumferential brush accommodating track is formed by portions of said electrical conductors of the armature assembly.

8. The dynamoelectric machine of claim 6 in which side portions of said electrical conductors are formed with a non-circular cross section configuration having a generally radial major axis, with side portions of the same electrical conductors being disposed approximately 180 electrical degrees apart.

9. A low inertia type armature assembly for use in a dynamoelectric machine and rotatable about an axis comprising a shaft; a magnetic core secured to said shaft and having an outer axially extending surface; a commutator including a number of commutator segments mounted to said shaft next to one end of the core forming a circumferential brush accommodating track; a number of electrical conductors connected in circuit with said commutator segments and having angularly spaced apart side portions extending the axial length of the core radially beyond the outer surface thereof with pairs of conductor side portions being joined together by end portions at the other end of the core, said side portions being non-circular in cross-section configuration and being fixed to rotate as a unit with the core with the largest cross-section dimensions being disposed in a direction generally away from the core; and means electrically insulating the electrical conductor side portions from the core whereby said electrical conductors efficiently transfer heat generated in the assembly away from the interior thereof during operation of the machine.

10. The armature assembly of claim 9 in which the cross-section configuration of the individual side portions approximates a trapezoid.

11. The armature assembly of claim 9 in which the ratio of the axial length of the core to the diameter of the shaft at the core is at least 17 to 1.

12. A low inertia type armature assembly for use in a dynamoelectric machine and rotatable about an axis comprising a shaft; a magnetic core secured to said shaft and having an outer axially extending surface; a number of electrical conductors having angularly spaced apart side portions extending the axial length of the core radially beyond the outer surface thereof with pairs of conductor side portions being joined together by end portions at one end of the core, said side portions being non-circular in cross-section configuration and being fixed to rotate as a unit with the core with the largest cross-section dimensions being disposed in a direction generally away from the core; means electrically insulating the electrical conductor side portions from the core; said electrical conductors having terminal portions secured to the shaft adjacent the other end of the core, said terminal portions having exposed outer surfaces forming a circumferentially extending brush track.

13. The low inertia type armature assembly of claim 12 in which said terminal portions are generally trapezoidal in cross-section configuration.

14. A method of manufacturing an armature assembly comprising the steps of: securing a magnetic core to a shaft; forming a layer of electrical insulation over selected outer surfaces of the core and shaft; arranging a number of coils on the core and shaft, with side portions of the coils being positioned on the layer formed on the core at spaced apart locations, and end portions joining side portions together being disposed next to the layer formed over the shaft; covering the side portions with electrical insulating material as the side portions are being firmly maintained against the layer formed on the core; and finishing the outer surface of the electrical insulating material to the desired dimension.

15. The method of claim 14 in which the magnetic core is secured to the shaft by sliding the core against a radial shoulder of the shaft at one end, and a sleeve having a radial shoulder is slid onto the shaft against the other end of the core, with the core being held tightly between the shoulders as the core, sleeve, and shaft are secured together into an integral unit.

16. A method of manufacturing an armature assembly having a magnetic core formed with first insulating material dipsosed over the outer surface thereof and secured to rotate with a shaft and a commutator having a number of circumferential commutator segments, the steps of manufacture comprising: sequentially arranging spaced apart side portions of a number of coils next to the insulating material outwardly of the core, with the side portions for the same coil being spaced approximately 180 electrical degrees apart; connecting leads of the same coils to adjacent commutator segments; and embedding the coil side portions in a second insulating material as the portions are being maintained firmly in engagement on the first insulating material, with the second insulating material being compatible to the first insulating material for bonding thereto.

17. The method of claim 16 in which the side portions of the coils are pre-formed with a non-circular cross-section configuration and, as the portions are being sequentially arranged next to the first insulating material, the largest dimension of the cross-section is being disposed in a generally radial position; the position being maintained as the coil side portions become embedded in the second insulating material.

References Cited

UNITED STATES PATENTS

| 2,154,740 | 4/1939 | Forss | 310—233 |
| 2,188,170 | 1/1940 | Zschau | 310—233 |
| 2,939,021 | 5/1960 | Gilchrist | 310—217 |
| 3,079,519 | 2/1963 | Kitson | 310—208 |

OTHER REFERENCES

German Patent pre-publication to Dunker et al., dated Dec. 27, 1957.

WARREN E. RAY, Primary Examiner

R. SKUDY, Assistant Examiner

U.S. Cl. X.R.

29—597, 598; 310—195, 233